J. J. PIQUÉ.
COOLING AND FREEZING OF FISH AND THE LIKE.
APPLICATION FILED MAY 21, 1920.
1,431,328.
Patented Oct. 10, 1922.
4 SHEETS—SHEET 3.
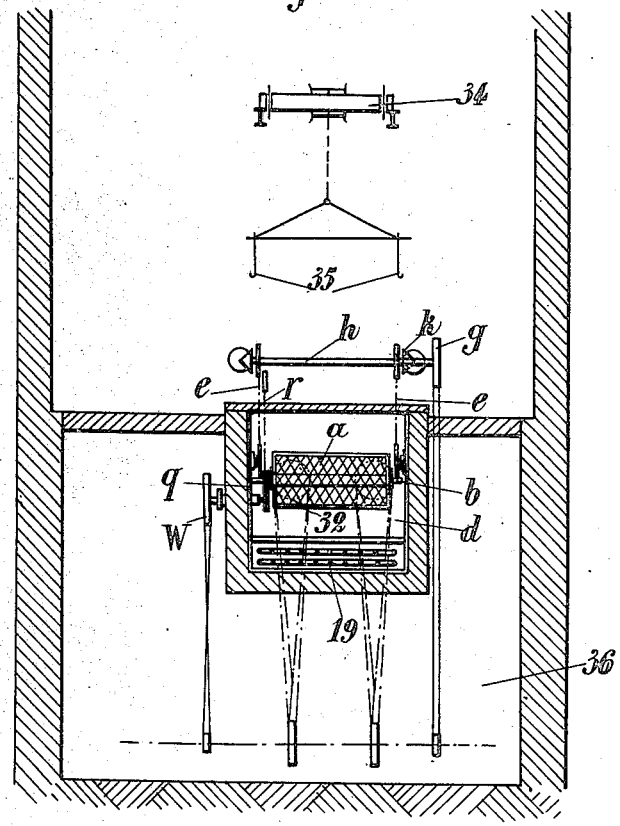
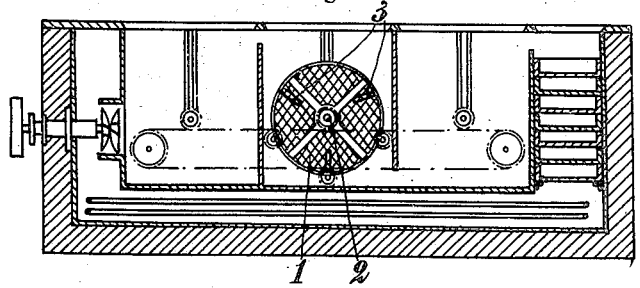
INVENTOR:
JEAN JULIEN PIQUÉ
ATTORNEY J. J. PIQUE.
COOLING AND FREEZING OF FISH AND THE LIKE.
APPLICATION FILED MAY 21, 1920.
1,431,328.
Patented Oct. 10, 1922.
4 SHEETS—SHEET 4.
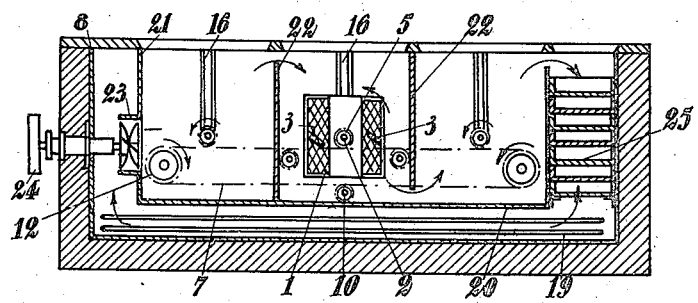
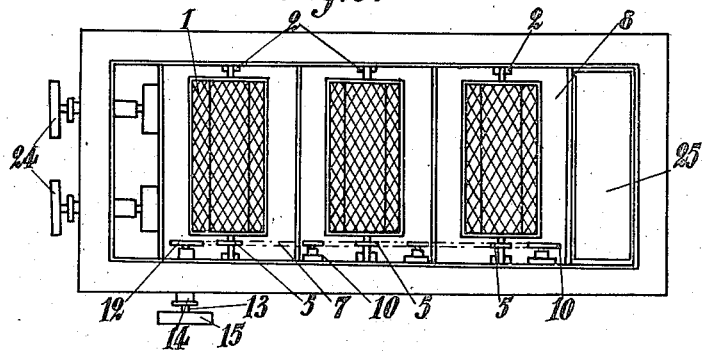
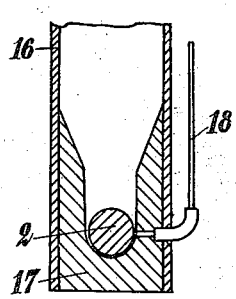
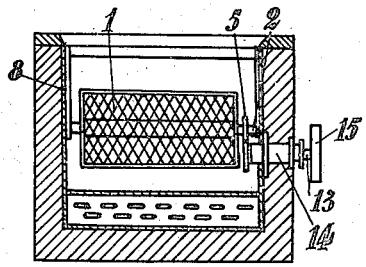
INVENTOR:
JEAN JULIEN PIQUÉ.
ATTORNEY Patented Oct. 10, 1922.　　　　　　　　　　　　　　　　　　　　　1,431,328

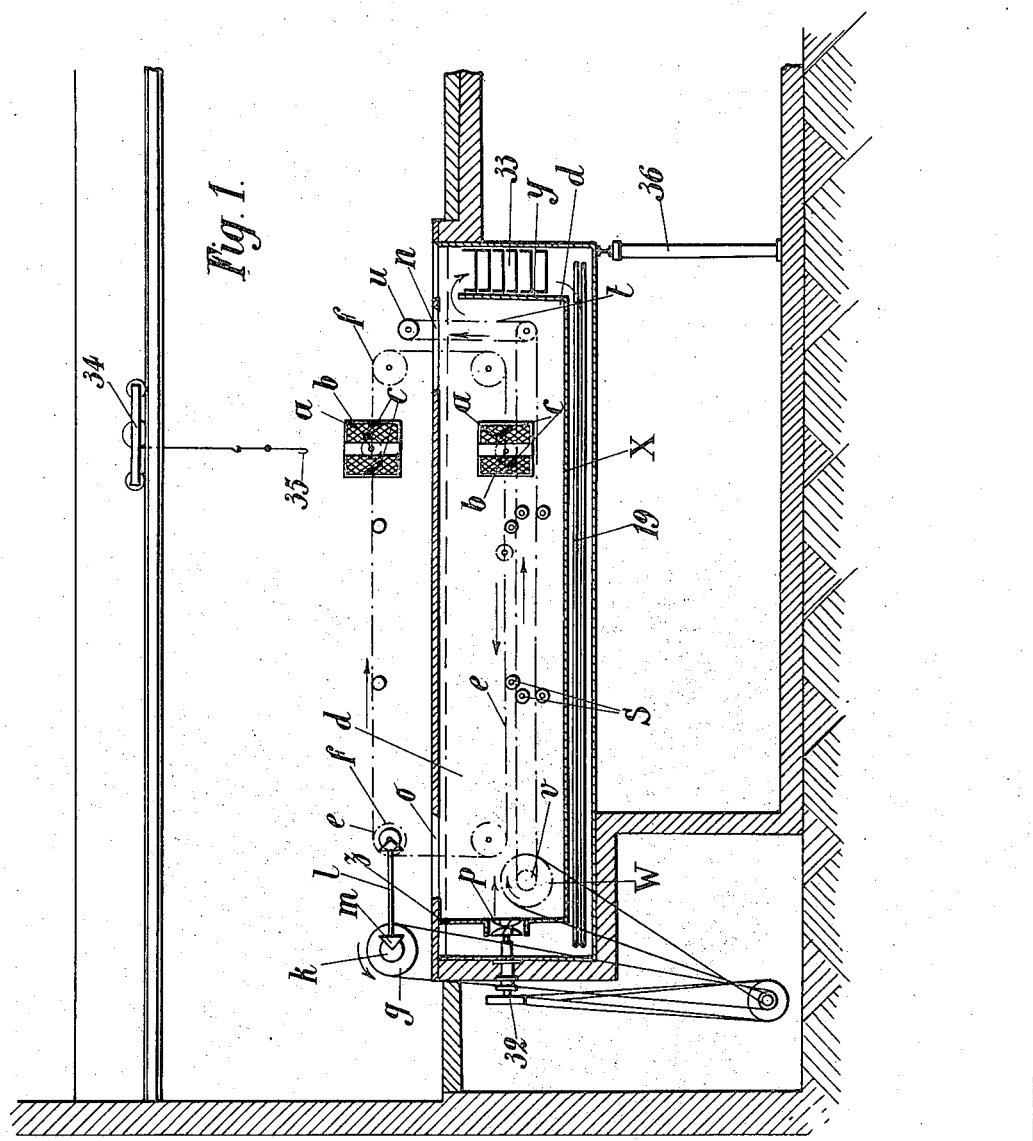

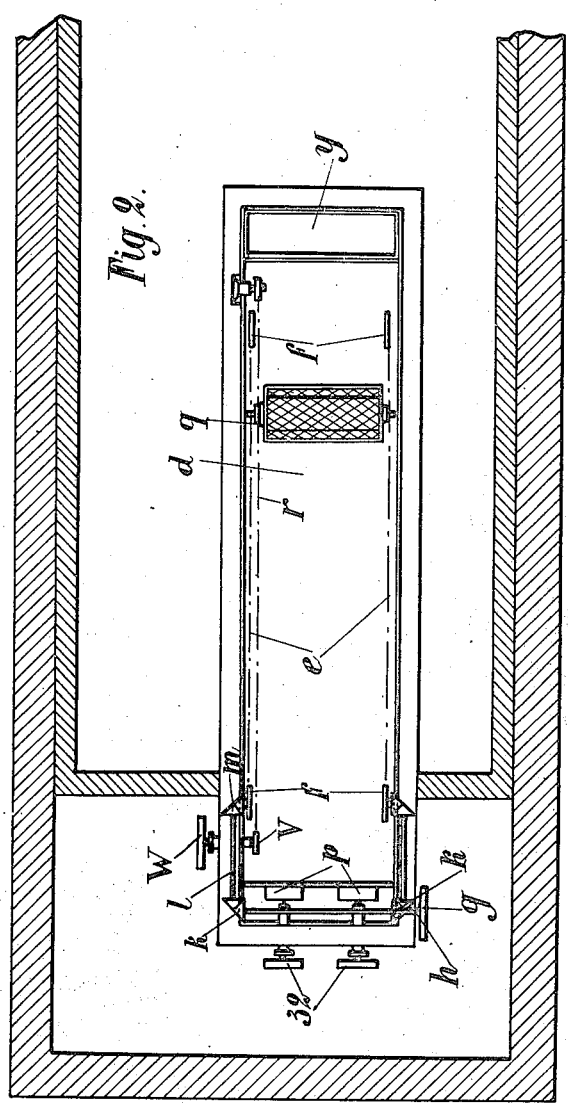

UNITED STATES PATENT OFFICE.

JEAN JULIEN PIQUÉ, OF HAMPSTEAD, LONDON, ENGLAND.

COOLING AND FREEZING OF FISH AND THE LIKE.

Application filed May 21, 1920. Serial No. 383,283.

*To all whom it may concern:*

Be it known that I, JEAN JULIEN PIQUÉ, a subject of the Belgian King, and resident of Hampstead, London, England, 115 Adelaide Road, have invented certain new and useful Improvements in and Relating to the Cooling and Freezing of Fish and the like, of which the following is a specification.

This invention relates to the cooling and freezing of fish and the like, and more specifically to apparatus for the automatic freezing of fish by means of brine, and it will herein be described with reference to this latter case as an example.

In congealing fish immersed in brine, it has been experienced that if a box or basket filled with fish is dipped into the brine, the fish forming the external rows are frozen a long time before the internal ones and that the time taken to freeze the whole basketful is nearly the same as the time taken to freeze only one fish whose thickness equals the total thickness of the layers in the basket, because the fish stick together and form a solid block.

To obtain a rapid cooling or freezing, a certain number of trays have been intercalated in the basket, on which the fish are spread out in single layers, leaving a space between the fish and the tray which is above, so that no layer of fish touches any other. In this way each fish is individually surrounded by the brine and the time taken to freeze the basketful is the same as for a single fish, provided of course the refrigerating machine is capable of removing out of the brine the specific heat and latent heat of the water and dry substances of the whole quantity of fish, and to freeze and undercool the same. The spreading out of the fish on the trays, however, involves a great deal of work and waste of time when cooling or freezing any large quantity of fish, e. g. at the time of gluts.

The object of the present invention is to provide a method and means for the cooling or freezing of a large quantity of fish or the like in the shortest possible time to cool or freeze each single fish thoroughly and without sticking the mass together and further to save the time wasted in spreading the fish on trays.

The invention consists in treating fish or the like in such a way that during the cooling proceess they are caused to move in a cooling medium so that the individual surface of every fish is exposed to the action of the cooling medium.

The invention also consists in apparatus for fish freezing, comprising a plurality of openwork boxes or baskets for containing the fish with baffles for controlling the floating or sinking of the fish, and means for rotating the baskets, the whole being so arranged that they can be removed independently, so that the time of treatment need not be the same for each basket.

The invention also consists in the improved methods and means for the cooling or freezing of fish or the like hereinafter described.

Referring to the accompanying diagrammatic drawings,

Figure 1 represents a side view:
Figure 2 a plan, and
Figure 3 an end view of one form of apparatus for carrying the invention into effect.

Figure 4 represents a side view;
Figure 5 a plan, and
Figure 6 represents on a larger scale a detail of the apparatus shown in Figures 4 and 5.

Figure 7 an end view of a modified form of apparatus for carrying the invention into effect.

Figure 8 represents a modified form of receptacle for the article to be cooled or frozen.

In carrying the invention into effect in one form by way of example as represented in Figures 1 to 3, the fish are contained in one or more baskets $a$ adapted to be revolved on suitable axles $b$. Each basket is made of external frame of sufficient strength, covered with wire netting and provided with an opening and door (not shown). On the inside, two sloping pallets $c$ are fitted, so as to drag with them and to divide the fish during the rotation of the baskets. These pallets $c$ are movable and can be sloped in any desired direction. Fish will float or sink according to the relative density of brine contained in the tank $d$; therefore, the pallets are caused to slope in one direction for fish that sink, and in the opposite direction for fish that float. This means that the method of revolving baskets can be applied for cooling purposes in which the percentage, e. g., of salt in brine, is small. To obtain a good shuffle of the fish, the baskets are filled to about five-eighths of their capacity only, they are turned slowly, and owing to the slight difference in specific gravity between the brine and the fish, the fish come up or sink slowly and are not bruised. The dropping in the tank $d$ and lifting out of the baskets may be effected in one way as follows:

An endless chain $e$ moving on each side of the tank $d$ is supported and driven by cogwheels $f$. The main drive is effected by a pulley $g$ fixed on a shaft $h$ on which are fitted bevel wheels $k$. The drive shaft $l$ and a similar pair of bevel wheels $m$ drive the aforesaid cogwheels $f$. Corresponding links of each of the endless chains are fitted with a bearing in which are placed the ends of the fish basket axles; the baskets are lowered into the tank through a suitable opening $n$ and lifted out of the brine through another opening $o$. The fish thus come in contact first with the warmest brine and by the time they reach the opening $o$ are after freezing, thoroughly undercooled, being immersed in the coldest brine delivered by the propellers $p$. The mechanism of the shafts and bevel wheels is arranged so as to leave an open space between the cogwheels $f$ to allow the passage of the basket. If desired, these cogwheels could each be fitted on an axle with a pulley driven directly from the main shaft, but the previously described arrangement is preferred. The fish baskets, on their way through the tank, are revolved. This movement is effected in one way as follows:

The two ends of the baskets are each provided with a plate on which is fixed an axle, one carrying a cogwheel $q$. The rotary movement of the basket is transmitted through this cogwheel by a chain $r$ which moves in the tank, underneath one of the traversing chains $e$. To prevent bending both the chains $e$ and $r$ are supported by smooth guide wheels or rollers $s$. The chain $r$ is driven by a cogwheel $v$ fixed on a shaft turning in a stuffing-box and fitted with a driving pulley $w$ on the outside of the tank. A suitably driven vertical endless chain $t$ is also provided running over a smooth wheel $u$ which allows the proper engagement of the teeth of the cogwheel $q$ with the chain $t$. This cogwheel is as wide as the width of the horizontal and vertical chains together, since both chains which are driven in different planes drive it alternately.

The fish basket, entering the tank, starts revolving as soon as its cogwheel $q$ comes in contact with the vertical chain $u$, e. g., as soon as the outside of the basket comes in contact with the brine. If the chain $t$ were not provided, the fish might be immersed for nearly ten minutes before the basket would be revolved by means of the horizontal chain and by that time the fish would stick together.

All the wheels working inside the tank turn on axles fitted in supports fixed on the sides of the tank. These axles are lubricated in one way by means of a tube which comes above the level of the brine, employing vaseline as a lubricant. The various cog and bevel wheels are conveniently fitted on axles fixed in supports placed on the cover of the tank and some or all may be protected by an envelope (not shown).

In the form shown in Figures 1 to 3, a separate bottom $x$ and two weirs $y$ and $z$ form the inside tank used for the fish freezing, and evaporator coils 19 cooling the brine are placed between the two bottoms. The weir $z$ has circular openings in which brine circulating propellers $p$ are rotated by pulleys 32 outside the tank. The space between the weir $y$ and the side of the tank $d$ is fitted with a filter 33 through which all the brine will flow continuously. No separate pump is thus needed for the filter, the circulation propellers $p$ doing the work, and the filtration trays being always under the brine level, no air can mix up with the brine, thus doing away with the chief cause of scum formation on the top of the brine which in experiments proved to be a serious trouble and disadvantage for efficient work. The lifting of the baskets $a$ is done by an overhead crane 34, the crane hooks 35 catching the basket axles. The fish being frozen, they can be poured in boxes for despatch or to be stored in the cold store.

A working platform may be made round the tank or the tank may be sunk in the ground. The radiating sides and bottom of the tank cool the room 36 underneath the working room, and the frozen fish can conveniently be stored directly in it.

The brine circulation in the tank is very effective through using propellers, revolving the baskets and moving the baskets towards the coldest brine, and the time to freeze the fish will be shorter than for fish spread out on trays.

I find that the spreading out on trays of, say 1950 lbs. of herrings would take 50 minutes, while the filling and fixing on the chain of a revolving basket containing 1950 lbs. of herrings will take only 6 minutes, therefore a considerable saving in time is secured.

In carrying the invention into effect according to a modification indicated in Figures 4, 5, 6 and 7, the fish is contained in a number of baskets 1, say for instance three, revolving on suitable axles 2. Each basket is made of external frames of sufficient strength, one of the sides serving as a cover. In Figure 4 only one of the three baskets is shown, the remaining two being identical thereto. All four sides and both ends of the baskets are made of wire netting fixed on the frames. On the inside, two sides of each are provided with sloping pallets 3, so as to drag with them and to divide the fish during the rotation. These pallets 3 are movable and can be sloped in any desired direction. Fish will float or sink according to the relative density of the brine, therefore the pallets are caused to slope in one direction for fish that sink, and in the opposite direction for fish that float. This means that the method of revolving baskets can be applied for cooling purposes in which the percentage of salt in the brine is small. To obtain a good shuffle of the fish, the baskets are filled to about five-eighths of their capacity only, they are turned slowly, and, owing to the slight difference in the specific gravity between the brine and the fish, the fish come up or sink slowly and are not bruised.

The two ends of the baskets are provided with plates on which are fixed axles 2 on one of which are fitted cogwheels 5. The rotation movement of the baskets 1 is transmitted to these cogwheels 5 by a chain 7 which moves in the tank 8 and is supported by idle wheels to prevent bending, above and underneath by a number of cogwheels 10 according to the size of the tank. The chain 7 is driven by a suitable cogwheel 12 fixed on a shaft 13 turning in a stuffing box 14 and fitted with a driving pulley 15 on the outside of the tank. On the vertical sides of the tank 8 are fixed guides 16 as indicated in detail in Figure 6. These guides are of U form and include a bearing 17 lubricated by means of vaseline or the like supplied through a tube 18, which comes above the level of the brine. Similar means of lubrication are used for the shafts of the wheels 10.

On one side between the guides 16 and baskets 1, and on the other side between the guides and the cogwheels 5, there exists a space, leaving a part of the axle free to catch the hooks of a lifting crane to take the basket out or to lower it into the tank. These hooks may be rod irons with a straight part longer than the distance from the spindles to the brine level. Thus, to introduce the baskets into the tank, they are lowered until the spindles glide into their respective guides.

The evaporator coils 19 cooling the brine are placed on the bottom of the tank and a separate bottom 20 on top of them and the space of the tank left is divided into compartments by weirs 22. The weir 21 is formed with one or two circular openings in which brine circulating propellers 23 rotate, worked by pulleys 24 outside the tank. The remaining weirs 22 alternately do not reach the bottom of the tank and are below the brine level, ensuring in that way an intense brine circulation. The right hand end of the tank viewed as in Figures 4 and 5, the space between the weir 22 and the side of the tank is fitted as a filter 25 through which all the brine will flow continuously. No separate pump is thus needed for the filter, the circulation propellers doing the work, and the filtration trays 25 being always under the brine level, no air can mix up with the brine, thus doing away with the chief cause of scum formation on the top of the brine which in experiments proved to be a big trouble and disadvantage for efficient work.

The temperature of the brine in the last compartment, the one near the filter, will be higher than in the compartment near the propellers. Each compartment may be marked with a number and a list made with the freezing time required for each compartment.

This kind of tank can be made as long as necessary, with as many compartments as wanted. The same principles for brine circulation, filtration and revolving baskets can be adapted to a single compartment tank.

According to a further modification we provide baskets of cylindrical form as indicated in Figure 8, and employ preferably three pallets 3 which may be radial as shown or may be adjusted to any desired angle as in the form described above.

I find that in a compartment used for a revolving basket containing 1950 lbs. of herrings, a freezing basket with trays could be fitted on which only 1020 lbs. of herrings can be spread out. The spreading out on trays of 1950 lbs. of herrings would take 50 minutes. The filling and lowering of a revolving basket of 1950 lbs. of herrings will take 6 minutes.

It will thus be seen that considerable time and also space is secured by using revolving baskets as described above.

The forms of the invention described above are given by way of example only, and modifications may be made. For instance, it is obvious that instead of agitating the fish or the like by means of mechanically operated containers, the fish might be moved in the cooling medium so as to expose the surface of individual fish to the action thereof by causing the brine or other cooling medium to be injected more or less forcibly among the fish so as to agitate them and prevent them from sticking together.

Having now fully described my said invention, what I claim and desire to secure by Letters Patent, is:

1. An apparatus for cooling or freezing fish or the like, comprising in combination a receptacle within which the fish are placed, a tank containing a suitable cooling medium, means for moving said receptacle through the tank, and means for simultaneously rotating the receptacle, whereby a shuffling of the fish takes place, substantially as set forth.

2. An apparatus for cooling or freezing fish or the like, comprising in combination a tank containing a suitable cooling medium, a plurality of receptacles within which the fish are placed and which are adapted to be immersed in the cooling medium contained in said tank, means for moving said receptacle through the tank in a direction opposite the flow of the cooling medium, and means for constantly rotating said receptacles while in contact with the cooling medium, substantially as set forth.

3. An apparatus for cooling or freezing fish or the like, comprising in combination a tank containing a bath of brine, substantially cylindrical openwork baskets, within which the fishes are placed and which are adapted to be immersed in the bath of brine contained in said tank, adjustable baffles within said baskets and means for constantly moving the baskets while in contact with the bath of brine, substantially as set forth.

4. An apparatus for cooling or freezing fish or the like, comprising in combination a tank containing a bath of brine, endless chains actuated in said tank, a suitable receptacle containing the fish and adapted to be supported and conveyed by said chains, and means for automatically rotating said receptacle during its passage through the tank, substantially as set forth.

5. An apparatus for cooling or freezing fish or the like, comprising in combination a tank containing a bath of brine, a second tank within the first named tank and suitably spaced therefrom, vertical baffles or weirs in said second tank, means for causing the brine to circulate through both tanks, suitable receptacles containing the fish and journaled in the second tank between said weirs, means for automatically rotating said receptacles, means for moving the receptacles in a direction opposite to the flow of brine, evaporator coils between the bottoms of both tanks for cooling the brine and a totally immersed filter in the first named tank and through which the brine must pass in circulating, substantially as set forth.

In testimony whereof I have hereunto set my hand in presence of two witnesses:

JEAN JULIEN PIQUÉ.

Witnesses:
   CHARLES EDWARD CUNNINGTON,
   CECIL HOWARD LANDER.